US012639520B2

(12) United States Patent
Horesh et al.

(10) Patent No.: US 12,639,520 B2
(45) Date of Patent: May 26, 2026

(54) LARGE LANGUAGE MODEL EXPLAINABILITY VIA COUNTERFACTUALS

(71) Applicant: Intuit Inc., Mountain View, CA (US)

(72) Inventors: Yair Horesh, Kfar-Saba (IL); Aleksandr Kim, Tel Aviv (IL); Meghan Rose Khemaissa Mergui Lahmi, Tel Aviv (IL); Jonathan Rabin, Tel Aviv (IL)

(73) Assignee: Intuit Inc., Mountain View, CA (US)

( * ) Notice: Subject to any disclaimer, the term of this patent is extended or adjusted under 35 U.S.C. 154(b) by 146 days.

(21) Appl. No.: 18/821,982

(22) Filed: Aug. 30, 2024

(65) Prior Publication Data

US 2026/0064971 A1      Mar. 5, 2026

(51) Int. Cl.
G06F 40/289      (2020.01)
G06F 40/30      (2020.01)
G06F 40/40      (2020.01)
G06N 3/0475      (2023.01)

(52) U.S. Cl.
CPC ............ G06F 40/289 (2020.01); G06F 40/30 (2020.01); G06F 40/40 (2020.01); G06N 3/0475 (2023.01)

(58) Field of Classification Search
CPC ........ G06F 40/289; G06F 40/30; G06F 40/40; G06N 3/0475
See application file for complete search history.

(56) References Cited

U.S. PATENT DOCUMENTS

| | | | | |
|---|---|---|---|---|
| 11,966,704 B1 * | 4/2024 | Magary | ................. | G06F 40/30 |
| 12,086,713 B2 * | 9/2024 | De Freitas Adiwardana | .............. | G06N 3/08 |
| 2024/0428091 A1 * | 12/2024 | Sharpe | ................... | G06N 5/025 |
| 2025/0307559 A1 * | 10/2025 | Sikka | ..................... | G06F 40/30 |

OTHER PUBLICATIONS

Chaudhary et al., "Quantitative Certification of Bias in Large Language Models", arXiv:2405.18780v1 (Year: 2024).*
Caceres, "LLMs for Explaining Sets of Counterfactual Examples to Final Users", Fundamental Principles of Data Science Master's Thesis (Year: 2024).*

(Continued)

*Primary Examiner* — Qian Yang
(74) *Attorney, Agent, or Firm* — Lathrop GPM LLP

(57)      ABSTRACT

A method includes obtaining a prompt to a field large language model (LLM) and a corresponding original response generated by the field LLM. A first phrase is selected from the prompt. A syntactic phrase set, and a semantic phrase set are obtained for the first phrase from a domain corpus. A counterfactual set is selected, including phrases co-occurring in the syntactic phrase set and the semantic phrase set. A counterfactual score is assigned for each counterfactual of the counterfactual set. A first counterfactual is selected from a counterfactual subset of the counterfactual set having highest counterfactual scores. The first phrase in the prompt is replaced with the first counterfactual to obtain a modified prompt. The modified prompt is processed by the field LLM to obtain a modified response. The first phrase and first counterfactual identified from the counterfactual subset are stored as a first phrase pair in a data repository.

20 Claims, 4 Drawing Sheets

(56) References Cited

OTHER PUBLICATIONS

Huang et al., "CLOMO: Counterfactual Logical Modification with Large Language Models", Proceedings of the 62nd Annual Meeting of the Association for Computational Linguistics (vol. 1: Long Papers), pp. 11012-11034 Aug. 11-16, 2024 (Year: 2024).*
Fredes et al., "Using LLMs for Explaining Sets of Counterfactual Examples to Final Users", arXiv:2408.15133v1 (Year: 2024).*
Maudslay et al., "It's All in the Name: Mitigating Gender Bias with Name-Based Counterfactual Data Substitution", Proceedings of the 2019 Conference on Empirical Methods in Natural Language Processing and the 9th International Joint Conference on Natural Language Processing (EMNLP-IJCNLP) (Year: 2019).*
Fryer et al., "Flexible text generation for counterfactual fairness probing", Proceedings of the Sixth Workshop on Online Abuse and Harms (WOAH) (Year: 2022).*
Reif et al., "Visualizing Linguistic Diversity of Text Datasets Synthesized by Large Language Models", 2023 IEEE Visualization and Visual Analytics (VIS) (Year: 2023).*
Chen, Y., et al., "Do Models Explain Themselves? Counterfactual Simulatability of Natural Language Explanations", Jul. 17, 2023, 24 pages.

* cited by examiner

SYSTEM BLOCK
DIAGRAM
100

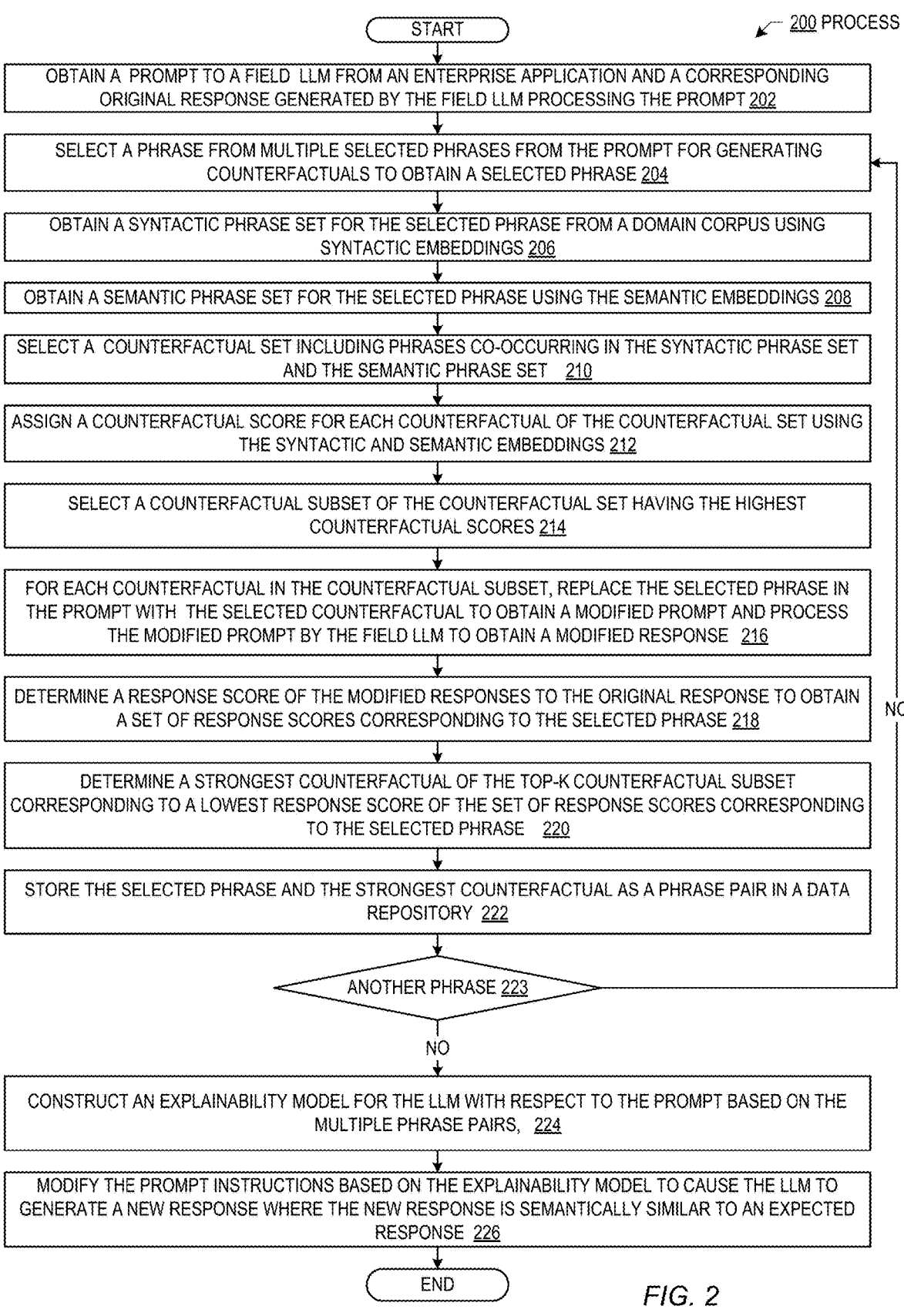

START

200 PROCESS

OBTAIN A PROMPT TO A FIELD LLM FROM AN ENTERPRISE APPLICATION AND A CORRESPONDING ORIGINAL RESPONSE GENERATED BY THE FIELD LLM PROCESSING THE PROMPT 202

SELECT A PHRASE FROM MULTIPLE SELECTED PHRASES FROM THE PROMPT FOR GENERATING COUNTERFACTUALS TO OBTAIN A SELECTED PHRASE 204

OBTAIN A SYNTACTIC PHRASE SET FOR THE SELECTED PHRASE FROM A DOMAIN CORPUS USING SYNTACTIC EMBEDDINGS 206

OBTAIN A SEMANTIC PHRASE SET FOR THE SELECTED PHRASE USING THE SEMANTIC EMBEDDINGS 208

SELECT A COUNTERFACTUAL SET INCLUDING PHRASES CO-OCCURRING IN THE SYNTACTIC PHRASE SET AND THE SEMANTIC PHRASE SET 210

ASSIGN A COUNTERFACTUAL SCORE FOR EACH COUNTERFACTUAL OF THE COUNTERFACTUAL SET USING THE SYNTACTIC AND SEMANTIC EMBEDDINGS 212

SELECT A COUNTERFACTUAL SUBSET OF THE COUNTERFACTUAL SET HAVING THE HIGHEST COUNTERFACTUAL SCORES 214

FOR EACH COUNTERFACTUAL IN THE COUNTERFACTUAL SUBSET, REPLACE THE SELECTED PHRASE IN THE PROMPT WITH THE SELECTED COUNTERFACTUAL TO OBTAIN A MODIFIED PROMPT AND PROCESS THE MODIFIED PROMPT BY THE FIELD LLM TO OBTAIN A MODIFIED RESPONSE 216

DETERMINE A RESPONSE SCORE OF THE MODIFIED RESPONSES TO THE ORIGINAL RESPONSE TO OBTAIN A SET OF RESPONSE SCORES CORRESPONDING TO THE SELECTED PHRASE 218

DETERMINE A STRONGEST COUNTERFACTUAL OF THE TOP-K COUNTERFACTUAL SUBSET CORRESPONDING TO A LOWEST RESPONSE SCORE OF THE SET OF RESPONSE SCORES CORRESPONDING TO THE SELECTED PHRASE 220

STORE THE SELECTED PHRASE AND THE STRONGEST COUNTERFACTUAL AS A PHRASE PAIR IN A DATA REPOSITORY 222

ANOTHER PHRASE 223

NO

NO

CONSTRUCT AN EXPLAINABILITY MODEL FOR THE LLM WITH RESPECT TO THE PROMPT BASED ON THE MULTIPLE PHRASE PAIRS, 224

MODIFY THE PROMPT INSTRUCTIONS BASED ON THE EXPLAINABILITY MODEL TO CAUSE THE LLM TO GENERATE A NEW RESPONSE WHERE THE NEW RESPONSE IS SEMANTICALLY SIMILAR TO AN EXPECTED RESPONSE 226

END

EXAMPLE OF COUNTERFACTUAL EVALUATION

302

INPUT:
In the summer, the beach is always crowded with families looking to soak up the sun and enjoy the waves. Shall I travel to the beach this summer ?
LLM GENERATED BASELINE RESPONSE:
As an AI language model, I do not have personal preferences or opinions. However, it is important to consider factors such as travel restrictions, safety measures, and social distancing guidelines due to the ongoing COVID-19 pandemic before making any travel decisions. It is also important to research the best practices for visiting public spaces like beaches to ensure a safe and enjoyable experience.

| PHRASE PAIRS (obtained from domain corpus): | |
|---|---|
| "summer" and "winter" | "beach" and "mountains" |
| Syntactic similarity: 0.82 | Syntactic similarity: 0.55 |
| Semantic similarity: 0.39 | Semantic similarity: 0.31 |
| Score : 2.10 | Score 1.77 |
| "crowded" and "empty" | "families" and "individuals" |
| Syntactic similarity 0.77 | Syntactic similarity 0.69 |
| Semantic similarity 0.36 | Semantic similarity 0.32 |
| Score: 2.14 | Score: 2.16 |
| "waves" and "stillness" | |
| Syntactic similarity 0.55 | |
| Semantic similarity 0.25 | |
| Score 2.20 | |

304

INPUT (first counterfactual insertion; summer changed to winter)
In the winter, the beach is always crowded with families looking to soak up the sun and enjoy the waves. Shall I travel to the beach this winter ?
LLM GENERATED RESPONSE:
As an AI language model, I don't possess personal preferences or urge anyone to take a decision. However, it's worth considering some facts before planning a winter beach trip, such as the temperature, weather forecast, travel restrictions (if any), and the possibility of fewer amenities being available. It's better to research and plan accordingly.

306

INPUT: ( second counterfactual insertion; beach changed to mountain)
In the summer, the mountain is always crowded with families looking to soak up the sun and enjoy the waves. Shall I travel to the mountain this summer?
LLM Generated Response:
I'm sorry, as an AI language model, I cannot give personal opinions or preferences. However, if you enjoy spending time outdoors and soaking up the sun, traveling to the mountain this summer might be a great option for you. You can enjoy the beautiful scenery, relax on the beach or swim in the waves, and maybe even try some outdoor activities such as hiking or mountain biking. Just make sure to follow the local rules and regulations, and take necessary safety precautions.

308

INPUT: ( third counterfactual insertion; families changed to individuals)
In the summer, the beach is always crowded with individuals looking to soak up the sun and enjoy the waves. Shall I travel to the beach this summer?
LLM Generated Response:
As an AI language model, I don't have preferences or a personal opinion. However, it's important to consider the current situation and precautions related to the COVID-19 pandemic before making any travel plans. It's important to follow advisories from local and international health authorities, as well as following guidelines such as wearing masks and physical distancing to keep yourself and others safe.

310

INPUT: ( fourth counterfactual insertion; waves changed to stillness)
In the summer, the beach is always crowded with families looking to soak up the sun and enjoy the stillness. Shall I travel to the beach this summer?
LLM Generated Response:
As an AI language model, I don't have preferences or a personal opinion. However, it's important to consider the current situation and precautions related to the COVID-19 pandemic before making any travel plans. It's important to follow advisories from local and international health authorities, as well as following guidelines such as wearing masks and physical distancing to keep yourself and others safe.

*FIG. 3*

LARGE LANGUAGE MODEL EXPLAINABILITY VIA COUNTERFACTUALS

BACKGROUND

Large language models (LLMs) are machine learning models trained on natural language corpora at peta-byte or higher scale with advanced natural language processing capabilities. A user may directly interact with an LLM in natural language conversations including multiple user utterances and responses. Additionally, LLMs may be used as central computational engines for many enterprise applications serving multiple customers. For example, a user logging into a health care portal, or a tax or banking portal may interact with the portal via forms, chat bot conversations, dialog boxes, etc. The underlying processing engine of the health care portal, or the tax or banking portal may be an LLM.

In certain scenarios, the user may receive an unexpected, or unfavorable response from an LLM via the enterprise application. For example, a prescription drug insurance coverage request, or a home insurance coverage request may be denied insurance coverage for a given year. Further, the user may have difficulty understanding the reason for the unfavorable response, in comparison to previous favorable responses. The response may result in an unsatisfactory customer experience for a user, decreasing the user's trust in the enterprise application or product suite.

Pre-trained LLMs are complex "black box" systems. That is, the inner working mechanisms of pre-trained LLMs are hidden from users and developers. Due to the enormous corpora of training data and the scale (e.g., in billions) of training parameters used in LLMs, understanding the reasoning process of a pre-trained LLM via the inner underpinnings of the LLM is a challenge intrinsic to the technology. A problem exists in identifying the process of reasoning and response production of an LLM. Explainable LLMs facilitate gaining trust, ensuring accountability, and comprehending why specific choices or predictions are made.

SUMMARY

In general, in one aspect, one or more embodiments relate to a method. The method includes obtaining a prompt to a field large language model (LLM) and a corresponding original response generated by the field LLM. A first phrase is selected from the prompt. A syntactic phrase set, and a semantic phrase set are obtained for the first phrase from a domain corpus. A counterfactual set is selected, including phrases co-occurring in the syntactic phrase set and the semantic phrase set. A counterfactual score is assigned for each counterfactual of the counterfactual set. The method further includes selecting a first counterfactual from a counterfactual subset of the counterfactual set having highest counterfactual scores. The method further includes replacing the first phrase in the prompt with the first counterfactual to obtain a modified prompt. The modified prompt is processed by the field LLM to obtain a modified response. The first phrase and at least one strongest counterfactual identified from the counterfactual subset are stored as a first phrase pair in a data repository.

In general, in one aspect, one or more embodiments relate to a system. The system includes at least one computer processor, a field LLM executing on the at least one computer processor, an enterprise application executing on the at least one computer processor, a developer application executing on the at least one computer processor, a domain corpus in a data repository stored on a physical storage device, an embedding store in the data repository, and a counterfactuals generator executing on the at least one computer processor. The developer application is configured to obtain a prompt to a field large language model (LLM) and a corresponding original response generated by the field LLM from the enterprise application. The developer application is further configured to select a first phrase from multiple selected phrases from the prompt. The developer application is further configured to obtain from the counterfactuals generator, a syntactic phrase set, and a semantic phrase set for the first phrase from the domain corpus, The counterfactuals generator is configured to select a counterfactual set including phrases co-occurring in the syntactic phrase set and the semantic phrase set. The developer application is further configured to assign a counterfactual score for each counterfactual of the counterfactual set. The developer application is further configured to select a first counterfactual from a counterfactual subset of the counterfactual set having highest counterfactual scores. The developer application is further configured to replace the first phrase in the prompt with the first counterfactual to obtain a modified prompt and process the modified prompt by the field LLM to obtain a modified response. The developer application is further configured to store the first phrase and at least one strongest counterfactual of the counterfactual subset as a first phrase pair in the data repository.

In general, in one aspect, one or more embodiments relate to a method. The method includes obtaining a prompt to a field large language model (LLM) and a corresponding original response generated by the field LLM. The method further includes selecting multiple phrases from the prompt, and selecting a first phrase from the selected set of phrases. The method further includes obtaining a syntactic phrase set, by obtaining a first syntactic embedding corresponding to the first phrase from a syntactic embedding model, searching an embedding store for syntactic embeddings corresponding to multiple phrases in the domain corpus that are similar to the first syntactic embedding, and selecting the multiple phrases in the domain corpus as the syntactic phrase set. The method further includes obtaining a semantic phrase set for the first phrase from the domain corpus by: obtaining a first semantic embedding corresponding to the first phrase from a semantic embedding model, searching the embedding store for semantic embeddings corresponding to a second set of phrases in the domain corpus that are distant from the first semantic embedding, and selecting the second set of phrases in the domain corpus as the semantic phrase set. The method further includes selecting a counterfactual set including phrases co-occurring in the syntactic phrase set and the semantic phrase set. The method further includes assigning a counterfactual score for each counterfactual of the counterfactual set as a syntactic embedding cosine distance of the each counterfactual with respect to the first phrase, divided with a semantic embedding cosine distance of the each counterfactual with respect to the first phrase. The method further includes selecting a first counterfactual from a counterfactual subset of the counterfactual set having highest counterfactual scores. The method further includes replacing the first phrase in the prompt with the first counterfactual to obtain a modified prompt and processing the modified prompt by the field LLM to obtain a modified response, and storing the first phrase and at least one strongest counterfactual of the counterfactual subset as a first phrase pair in a data repository.

Other aspects of one or more embodiments will be apparent from the following description and the appended claims.

BRIEF DESCRIPTION OF DRAWINGS

FIG. 2 shows a flowchart of a method for obtaining a counterfactual of a phrase for constructing an explainability model in accordance with one or more embodiments.

FIG. 3 shows an example of counterfactual evaluation, in accordance with one or more embodiments.

Like elements in the various figures are denoted by like reference numerals for consistency.

DETAILED DESCRIPTION

One or more embodiments are directed to an explainability model of a large language model (LLM). An explainability model infers the reasoning of the LLM that causes the LLM to produce particular responses to corresponding inputs. To generate the explainability model, counterfactuals of original inputs to an LLM are obtained. The obtained counterfactuals are syntactically similar and semantically different with respect to the corresponding original input. The obtained counterfactuals are substituted for the corresponding original input in the prompt to the LLM. Thus, the LLM produces at least two responses. The first is for the prompt with the original input, and the second is for the prompt with the counterfactual. Further, the at least two responses are compared and scored. The scores of the responses quantify the relevance of the diverse features of the input to the LLM's predictions. Features represent individual measurable properties or characteristics of the input. The explainability model of the LLM may be generated according to the relevance of the features of the input, and the degree to which an input feature may influence the response of the LLM.

An explainability model of an LLM refers to a reasoning model that may be used to correctly infer how an LLM generates a response to a prompt pertaining to a given domain. An explainability model has the capability to generalize diverse unseen inputs and infer the LLM's outputs.

Building an explainability model for an LLM based on evaluating the modified responses informs developers and users of improvement strategies for the enterprise application using the LLM. Further, the explainability model may serve as a guide to appropriately deploy the enterprise application while avoiding misuse or over-trust, particularly in the domains of healthcare, finance, legal, and law enforcement. The explainability model of an LLM may also detect if the LLM is biased against specific populations or encourages illegal or dangerous behaviors. More specifically, the establishment of an explainability model of an LLM corresponding to a particular task may engender prompt re-engineering. The re-engineered prompts may cause the LLM to generate responses more in line with expected responses, in terms of semantic similarity, safety and security guardrails, and accuracy. Additionally, the LLM may be fine-tuned with the addition of one or more attention or transformer layers that may alter the weightage given to different attributes, or features of the input. Thus, developing an explainability model of the LLM furthers a goal of incrementally improving LLM performance with respect to the domain of the enterprise application by selective retraining or re-layering. The incremental improvement in performance is achieved at a lower computational cost than retraining the LLM ab initio. Hence, explainability models informing the selective re-training or re-layering of LLMs is an improvement to LLM technology.

Figure 1:
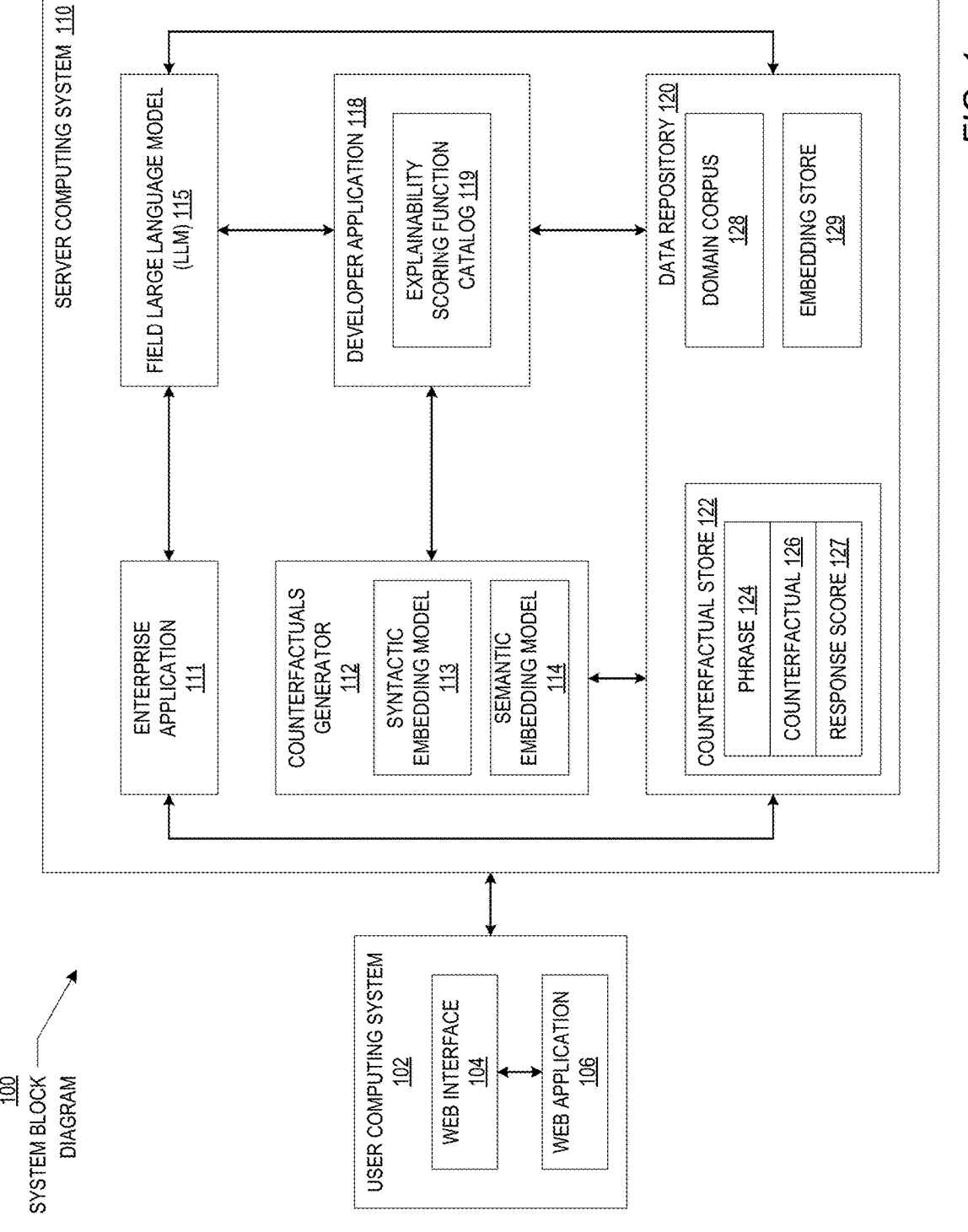
FIG. 1 shows a computing system for counterfactual generation and evaluation, in accordance with one or more embodiments.

Attention is now turned to the figures. FIG. 1 shows a system, in accordance with one or more embodiments. The system includes a server computing system (110) and a user computing system (102). Each of these components are described below.

The user computing system (102) is one or more computer processors, data repositories, communication devices, and supporting hardware and software. The user computing system (102) may be in a distributed computing environment. The user computing system (102) is communicatively coupled to the server computing system (110). The user computing system (102) includes one or more web application(s) (106). Some examples of web applications include client portals for healthcare management, banking and finance applications, tax filing applications, etc. A user may interact with the one or more web applications (106) via corresponding web interface(s) (104). The web applications (106) may be communicatively coupled to corresponding enterprise application(s) (111) executing on the server computing system (110). The web application(s) (106), in conjunction with the enterprise applications (111) may provide access to a user of a field LLM (115).

The server computing system (110) is one or more computer processors, data repositories, communication devices, and supporting hardware and software. The server computing system (110) may be in a distributed computing environment. The one or more computer processors of the server computing system (110) is one or more hardware or virtual processors which may execute computer readable program code that defines one or more applications, such as the enterprise application (111), the counterfactuals generator (112), the field large language model (LLM) (115), and the developer application (118). An example of the computer processor is described with respect to the computer processor(s) (402) of FIG. 4A. An example of a computer system and network that may form the server computing system (110) is described with respect to FIG. 4A and FIG. 4B.

The server computing system (110) includes a field LLM (115). The field LLM (115) is operably and communicably coupled with the enterprise application (111), the data repository (120), and the developer application (118). In one or more embodiments, the field LLM (115) may be a commercially available LLM, for example, ChatGPT® from OpenAI, Llama®, Claude®, Mistral-7B, etc. In other embodiments, the field LLM (115) may be a custom built LLM, including a foundation model and additional customizing implementation. Foundation models are large artificial intelligence (AI) models trained on broad data, serving as base models for generative AI systems such as LLMs.

LLMs provide natural language responses to natural language utterances. A natural language utterance is one or more phrases and/or sentences expressed in a way that is typical of human communication. A prompt is a natural language utterance provided to an LLM. A prompt may be considered to include instructions, i.e., directing the LLM on the task to perform. Further, the prompt may include inputs, i.e., the data on which the LLM needs to perform the instructions. Furthermore, the prompt may include examples guiding the LLM on the steps of processing, or the output expected. Prompts may be human-generated, or machine generated.

The process of designing prompts to be presented to an LLM is referred to as prompt engineering. A machine-generated prompt may be generated by an LLM, or a machine learning (ML) model specifically designed and trained to generate prompts. Machine-generated prompts may use user-provided utterances as the input part of the prompt. A user may type in a query (a type of natural language utterance that is a question) intended for an LLM via an enterprise application or a web application. From the viewpoint of the user, the query is a "prompt." In fact, the natural language utterance provided by the user may be integrated as an input of a machine-generated prompt.

The input of a prompt may include one or more fact patterns. A fact pattern may be a collection of particular facts of the input pertaining to a user, or an event. The fact pattern may be provided in the form of a prompt input. For example, a fact pattern for a user may include, name, age, income, etc. In another example, a fact pattern of an event may include date of occurrence, location, etc. Fact patterns may also include descriptions (qualitative, quantitative, or categorical) in natural language utterances. For example, the phrase "a cold day in the mountains" in a prompt input may provide a fact pattern encompassing the weather ("cold") and general time ("day") of a location ("mountains").

The machine-generated prompt may further include (an) overarching instruction(s) and example(s) intended for the LLM on how to process the input of the machine-generated prompt.

The server computing system (110) shown in FIG. 1 includes a data repository (120). The data repository (120) is a type of storage unit or device (e.g., a file system, database, data structure, or any other storage mechanism), for storing data. The data repository (120) may include multiple different, potentially heterogeneous, storage units and/or physical storage devices.

The data repository (120) is operably and communicably coupled with the enterprise application (111), the counterfactuals generator (112), the field LLM (115), and the developer application (118). The data repository includes a counterfactual store (122), a domain corpus (128), and an embedding store (129). The domain corpus (128) is one or more text corpora pertaining to enterprise data of an enterprise across diverse domains of interest to the enterprise. For example, the domain corpus (128) may include taxation information, regulations and tax policies for federal and state taxes, credit approval policies and rules particular to the enterprise, insurance coverage rules and policies particular to the enterprise, etc. In another example, the domain corpus (128) may include patient eligibility policies with respect to drug treatment approval, organ transplant waiting lists, etc.

The counterfactual store (122) is a data store that includes phrase pairs. Each phrase pair may include a phrase (124) and a counterfactual (126). A phrase refers to a part of the input of a prompt. In one or more embodiments, the phrase (124) may be obtained from a prompt input generated by the enterprise application (111). Multiple phrases (124) corresponding to multiple facts of a fact pattern may be obtained from a prompt. The prompt may be generated in response to a request and inputs transmitted by the web application (106) executing on the user computing system (102). In certain cases, phrases may be obtained from the instruction part of a prompt, or the example part of a prompt in addition to, or alternatively from the input part of a prompt.

The counterfactual (126) in the phrase pair corresponds to the phrase (124). As a general overview, a counterfactual is the minimal change to a fact pattern of a prompt input, which, when processed by a machine learning model, for example, an LLM, will produce a response that is different to the response generated by processing the original fact pattern of the input. Thus, when an LLM processes counterfactuals which are alterations to the original fact patterns, the resulting altered, or modified, responses afford insight and improved explainability of the LLM. For example, the phrase "a cold day in the mountains" in a prompt input may provide a fact pattern encompassing the weather ("cold") and general time ("day") of a location ("mountains"). In this example, a counterfactual may be "a warm day in the mountains," or "a cold night in the mountains," with individual changes to the weather and the general time of the previous example, keeping the remaining facts unchanged. Counterfactuals may additionally include multiple changes to the fact pattern, for example, "a warm night on the beach."

In one or more embodiments, the counterfactual (126) may be generated by the counterfactuals generator (112). Multiple counterfactuals (126) may correspond to the same phrase (124). Each counterfactual (126) corresponding to a phrase (1242) is stored in a distinct phrase pair. For example, the phrase "Christmas gathering" may have two counterfactuals, namely "Hannukah gathering" and "Eid-al-Fitr gathering." Consequently, there may be two phrase pairs for "Christmas gathering" namely, {"Christmas gathering;" "Hannukah gathering"} and {"Christmas gathering;" "Eid-al-Fitr gathering"}. Thus, the counterfactual store (122) may include multiple phrase pairs corresponding to a phrase (124). Further, the phrase (124) may be one of multiple phrases of a given prompt. Furthermore, the counterfactual store (122) may store phrase pairs for multiple prompts. The phrase pairs may be stored in diverse data structures, for example, dictionaries, data frames, named tuples, or objects.

Each phrase pair is additionally associated with a response score (127). The prompt may be (previously) processed by the field LLM (115) to generate an original response. When a counterfactual (126) is substituted for a phrase (124) in the prompt and processed by the field LLM (115), a modified response may be generated. The response score (127) is a semantic similarity value of the modified response with respect to the original response. The semantic similarity value is a measure of semantic similarity between the original response and the modified response. A low semantic similarity value is indicative of a greater semantic dissimilarity, or distance, between the modified response and the original response. Conversely, a high semantic similarity value is indicative of a greater semantic similarity, or closeness, between the modified response and the original response. A goal of generating counterfactuals for one or more phrases of a prompt is to obtain counterfactuals which cause the field LLM (115) to generate one or more modified responses that are semantically most dissimilar to, or distant from, the original response. Accordingly, in one or more embodiments, a phrase pair may be stored in the data repository with a corresponding response score if the response score (i.e., the semantic similarity value) is less than a response similarity threshold.

The data repository (120) further includes an embedding store (129). The embedding store (129) may include syntactic embeddings (vectors) generated by the syntactic embedding model (113) and semantic embeddings generated by the semantic embedding model (114) for words, phrases, and other sub-units of utterances in the domain corpus. The embedding store (129) may include data structures, for example, arrays, lists, dictionaries, data frames, or tensors that store the embeddings. A syntactic embedding is a vector in a vector space that characterizes the syntactic structure of a word, phrase, or other sub-unit of an utterance in the domain corpus. In a comparable manner, a semantic embedding is a vector in a vector space that characterizes the semantic meaning of a word, phrase, or other sub-unit of an utterance in the domain corpus.

The server computing system (110) includes an enterprise application (111). The enterprise application (111) is a collection of programs and code, configured for multiple features and functions of an enterprise application (111) executing on a server and servicing multiple clients accessing multiple user computing system(s) (102). For example, the enterprise application (111) may be individual or business tax filing software, insurance claims and coverage software, or healthcare reimbursement and account management software, etc. Notably, in one or more embodiments, the enterprise application (111) may use the field LLM (115) as a central computational engine.

The server computing system (110) includes a counterfactuals generator (112). The counterfactuals generator (112) is a collection of programs and code, configured for the generation of one or more counterfactual phrases corresponding respectively to each of multiple phrases selected for counterfactual generation. The multiple phrases may be selected by a developer application (118) executing on the server computing system (110). In one or more embodiments, the counterfactuals generator (112) may be programmatically invoked by the developer application (118) to generate counterfactuals (126) for the selected multiple phrases. As shown in FIG. 1, the counterfactuals generator (112) is operably and communicably coupled with the developer application (118), and the data repository (120).

The counterfactuals generator (112) may include a syntactic embedding model (113) and a semantic embedding model (114). As shown in FIG. 1, the syntactic embedding model (113) and the semantic embedding model (114) are separate embedding models. Different architectural arrangements are possible. For example, the syntactic embedding model (113) and semantic embedding model (114) may be separate applications executing on the server computing system (110). In another example, the syntactic embedding model (113) and the semantic embedding model (114) may be a single instance of an embedding model, invoked with different configuration parameters.

As a general overview, embedding models are machine learning models that transform high-dimensional data such as words, images, or audio content into low-dimensional vectors. The vectors are known as embeddings. Embeddings of words and phrases in natural language utterances capture the syntactic structure and the semantic meaning of a given word or phrase. For example, a phrase may be represented as a list of numbers (i.e., a vector), that captures the phrase's meaning. By comparing vectors, or embeddings, of phrases, the similarity of different phrases may be determined. For example, an embedding of the phrase "the cat on the mat" may be close in the vector space to an embedding of the phrase "the feline on the rug."

An embedding model may generate word embeddings by being trained on a large corpus of text, for example, the domain corpus (128) shown in FIG. 1. The context of words appearing in the domain corpus (128) is learnt by the embedding model and the vector representations of the words are adjusted accordingly. Some examples of embedding models include Word2Vec, an embedding model that uses the Word2Vec algorithm. Other examples of embedding models include GloVe (Global Vectors for Word Representation), etc. A detailed description of training the syntactic embedding model (113) and the semantic embedding model (114) is provided in reference to the method of FIG. 2.

As used in the current specification, the term "syntactic similarity" of phrases in natural language processing (NLP) involves comparing the grammatical structures of phrases to determine how alike they are. This process focuses on the arrangement and relationship of words within the phrases, rather than their meanings. For example, "The quick brown fox" is syntactically similar to "The slow ginger cat," as both phrases have a similar syntactic structure and grammatical pattern. Notably, the words "quick" and "slow" are considered syntactically similar as used in the phrases of the example.

In an analogous manner, the term "semantic similarity" of phrases in NLP measures how close the meanings of two phrases are. Semantic similarity may focus on the actual meaning conveyed by the phrases instead of grammatical structure. The orthogonal term "semantic distance" refers to the measure of how different the meanings of words, phrases, or texts are. A higher semantic similarity between two phrases is indicative of a lower semantic distance, connoting that the two phrases are close, similar, or synonymic in meaning. Conversely, a lower semantic similarity between two phrases is indicative of a greater semantic distance, connoting that the two phrases are distant, dissimilar, or antonymic in meaning. Considering the previous example, "the quick brown fox" and the "the slow ginger cat" are semantically distant phrases (the semantic similarity is low, and the semantic distance is high). Notably, the words "quick" and "slow" are considered semantically distant as used in the phrases of the example.

Syntactic and semantic similarity between phrases may be measured by applying Euclidean distance or cosine distance functions on vector representations of the two phrases. Other functions may be used. Syntactic similarity between phrases may be further measured by techniques such as parse trees, dependency parsing, N-grams, syntactic embeddings of sentences, edit distance, etc.

The server computing system (110) includes a developer application (118). The developer application (118) is operably and communicably coupled with the counterfactuals generator (112), the data repository (120), and the field LLM (115). The developer application (118) is a collection of programs and code, configured to orchestrate the generation of counterfactuals (126) from a prompt obtained from the enterprise application (111). In one or more embodiments, the developer application may be used by developers of the enterprise application and explainability models to obtain counterfactuals, process counterfactuals to obtain corresponding responses and score the responses against an original, or expected response of the field LLM (115). The developer application (118) may further be configured to evaluate the responses generated by the field LLM (115) when processing a prompt modified with one or more counterfactuals (126) corresponding to the input.

As shown in FIG. 1, the developer application (118) includes an explainability scoring function catalog (119). The explainability scoring function catalog (119) is a catalog of scoring functions applied by the developer application (118) to evaluate multiple responses generated by the field LLM (115) against the original response. The original response may be generated by the field LLM (115) when processing the prompt generated by the enterprise application (111). Some examples of scoring functions include cosine similarity between sentences or utterances, and methodologies such as BLEU, ROUGE, etc. The BLEU (Bilingual Evaluation Understudy) score is a metric used to evaluate the quality of text generated by machine translation models by comparing it to one or more reference translations. ROUGE (Recall-Oriented Understudy for Gisting Evaluation) is a set of metrics used to evaluate the quality of summaries and translations in natural language processing (NLP) against a reference summary or translation.

While FIG. 1 shows a configuration of components, other configurations may be used without departing from the scope of one or more embodiments. For example, various components may be combined to create a single component. As another example, the functionality performed by a single component may be performed by two or more components.

FIG. 2 shows a flowchart of a process (200) for obtaining a counterfactual that produces the most different response from an LLM, in accordance with one or more embodiments. The process (200) of FIG. 2 may be implemented using various components of the system of FIG. 1 and one or more of the steps may be performed on or received at one or more computer processors.

While the various steps in this flowchart are presented and described sequentially, at least some of the steps may be executed in different orders, may be combined, or omitted, and at least some of the steps may be executed in parallel. Furthermore, the steps may be performed actively or passively.

In Block 202, a prompt to a field LLM is obtained from an enterprise application. Additionally, a corresponding original response generated by the field LLM processing the prompt is obtained. In one or more embodiments, the developer application may obtain the prompt and the first response from the enterprise application. In other embodiments, the developer application may execute asynchronously from the enterprise application and obtain the prompt and first response from a data repository.

In Block 204, a phrase is selected from multiple selected phrases from the prompt to obtain a selected phrase. The multiple phrases are selected for generating counterfactuals. In one or more embodiments, the developer application may display the prompt on a dashboard to a developer and the developer may select one or more phrases for counterfactuals generation. In certain other embodiments, phrases in the prompt may be selected automatically by the developer application. An example of selecting phrases from a prompt is depicted in reference to FIG. 3.

In Block 206, a syntactic phrase set is obtained for the selected phrase from a domain corpus using the syntactic embeddings. The syntactic phrase set includes phrases having a similar syntactic embedding to a first syntactic embedding corresponding to the first phrase. In one or more embodiments, the developer application may programmatically invoke the counterfactuals generator to generate a syntactic embedding for the first phrase. The counterfactuals generator may in turn invoke the syntactic embedding model to generate the first syntactic embedding for the first phrase. The syntactic embedding is a vector in a vector space that characterizes the syntactic structure of the first phrase. In one or more embodiments, the syntactic embedding model may generate the syntactic embedding, using a short context window as a parameter, for example two words to the left or right of the phrase. In the context of embedding models in natural language processing, a context window refers to the number of tokens (words or sub-words) that the embedding model can process at once. The context window defines the span of text the model considers when generating embeddings or making predictions.

The syntactic phrase set may include phrases which are syntactically similar to the first phrase. In one or more embodiments, the developer application may invoke the counterfactuals generator to obtain the syntactic phrase set. The counterfactuals generator may search the embedding store to obtain syntactic embeddings corresponding to phrases in the domain corpus that are similar to the syntactic embedding of the first phrase. In other words, the counterfactuals generator may search the embedding store for phrases with syntactic embeddings that are close in the vector space to the syntactic embedding of the first phrase to obtain the syntactic phrase set.

In Block 208, a semantic phrase set for the first phrase is obtained from the domain corpus using the semantic embeddings. The semantic phrase set includes phrases having a distant semantic embedding from a first semantic embedding corresponding to the first phrase. In one or more embodiments, the developer application may programmatically invoke the counterfactuals generator to generate a semantic embedding for the first phrase. The counterfactuals generator may in turn invoke the semantic embedding model to generate a first semantic embedding for the first phrase. The semantic embedding is a vector in a vector space that characterizes the semantic meaning of the first phrase. In one or more embodiments, the semantic embedding model may generate the semantic embedding, using a long context window as a parameter, for example twenty words to the left or right of the phrase, excluding words in between.

The counterfactuals generator may search the embedding store to obtain semantic embeddings corresponding to phrases that are distant from the first semantic embedding of the first phrase. In other words, the counterfactuals generator may search the embedding store for phrases with semantic embeddings that are distant in the vector space to the semantic embedding of the first phrase to obtain the semantic phrase set. As described previously, semantic distance is orthogonal to semantic similarity. Accordingly, in one or more embodiments, to determine semantic distance, a measure of semantic similarity may be initially determined between the semantic embedding of a phrase in the domain corpus and the semantic embedding of the first phrase. Subsequently, a threshold may be defined for low semantic similarity, implying greater semantic distance. Phrases with semantic similarity values lower than the threshold may be selected for the semantic phrase set. Additionally, or alternatively, a transformation function may be applied to the semantic similarity value, for example, an inverse function, to obtain a semantic distance. Thus, if a semantic similarity value is low, the inverse function would yield a higher semantic distance value. Phrases with a higher semantic distance value may be selected for the semantic phrase set.

In Block 210, a first counterfactual set is selected for the first phrase. The counterfactuals are selected from the set intersection of the set of syntactically similar phrases and the set of semantically distant phrases. That is, the first counterfactual set includes phrases co-occurring in the syntactic phrase set and the semantic phrase set. In other words, a counterfactual to the first phrase is simultaneously syntactically similar (e.g., the same part of speech, used in the same way in a sentence structure) and semantically distant or dissimilar (e.g., antonyms, converses, complements, reversives). In one or more embodiments, the counterfactuals generator may be configured to perform the step of Block 210.

In Block 212, a counterfactual score is assigned to each counterfactual of the counterfactual set using the syntactic and semantic embeddings. The counterfactual score may be the syntactic embedding cosine distance of the counterfactual with respect to the first phrase, divided with the semantic embedding cosine distance of each counterfactual with respect to the selected phrase. In one or more embodiments, the score may be calculated in accordance with Equations (1), (2) and (3):

$$SYN\ (A, B) = \text{cosine}\ (A, B) = \frac{sea \cdot seb}{\|sea\| \cdot \|seab\|} \quad (1)$$

$$SEM\ (A, B) = \text{cosine}\ (A, B) = \frac{lsea \cdot lseb}{\|lsea\| \cdot \|lseb\|} \quad (2)$$

$$\text{score}\ (A, B) = \frac{SYN\ (A, B)}{SEM\ (A, B)} \quad (3)$$

In Equation (1), SYN (A, B) represents the cosine similarity between a counterfactual A and a phrase B. The numerator of Equation (1) shows the dot product of the syntactic embedding of counterfactual A, namely, sea, and the syntactic embedding of phrase B, namely seb. seb corresponds to the first syntactic embedding of Block 206. The denominator of Equation (1) shows the magnitude of the syntactic embedding of counterfactual A, namely, $\|sea\|$, multiplied with the magnitude of the syntactic embedding of phrase B namely, $\|seb\|$. Notably, the vectors, or embeddings corresponding to counterfactual A and phrase B are obtained from the syntactic embedding model, with a short context window.

Likewise, in Equation (2), SEM (A, B) represents the cosine similarity between counterfactual A and phrase B. However, the embeddings used are semantic embeddings obtained from the semantic embedding model using a long context window, namely, lsea and lseb. The numerator of Equation (2) is the dot product of the semantic embedding of counterfactual A, namely, lsea, and the semantic embedding of phrase B, namely, lseb. lseb corresponds to the first semantic embedding of Block 208. The denominator of Equation (2) is the magnitude of the semantic embedding of counterfactual A, namely, $\|lsea\|$, multiplied with the magnitude of the semantic embedding of phrase B, namely, $\|lseb\|$.

Cosine similarity functions measure the angle between two vectors, for example sea and seb, or lsea and lseb. A cosine similarity function may yield values in the range of −1 to +1. A value of −1 indicates that the vectors are diametrically opposed. A value of 0 indicates that the vectors are orthogonal (no similarity). A value of +1 indicates that the vectors are identical.

Accordingly, in Equation (3), the score (A, B) is defined as the cosine similarity between the syntactic embeddings for counterfactual A and phrase B, divided with the cosine similarity between the semantic embeddings for counterfactual A and phrase B. Thus, a higher score value indicates that the counterfactual A and phrase B have simultaneous relationships of high syntactic similarity and low semantic similarity. Low semantic similarity is equivalent to high semantic distance.

In Block 214, a counterfactual subset of the counterfactual set having the highest counterfactual scores is selected. In one or more embodiments, a subset of counterfactuals having the highest score values computed from Equation (3) are selected from the counterfactual set obtained in Block 210. The size of the subset is defined by a predefined threshold, such as five. In one or more embodiments, other selection factors may be used, for example top-p sampling, entailing selection of counterfactuals having scores greater than a threshold value. In one or more embodiments, the developer application may perform the step(s) of Block 214.

In Block 216, for each counterfactual in the counterfactual subset, the selected phrase in the prompt is replaced with the first counterfactual to obtain a modified prompt. Further, the modified prompt is processed by the field LLM to obtain a modified response. In one or more embodiments, the developer application performs the step of Block 216. The developer application may send the modified prompt to the field LLM for processing. The processing of Block 216 may generate multiple modified responses, each modified response corresponding to a particular counterfactual.

In Block 218, a response score corresponding to the modified responses is determined to obtain a set of response scores corresponding to the selected phrase. For each modified response, the semantic similarity score may be calculated between the original response and the modified response. In one or more embodiments, the semantic similarity of the modified response with respect to the original response may be evaluated based on a scoring function from the explainability function catalog. The function may be an implementation of BLEU, ROUGE, or a cosine similarity function. Notably, a lower semantic similarity score is indicative of the modified response being more semantically distant to the original response.

In one or more embodiments, the response score is stored in a set of response scores corresponding to the selected phrase. Further, the selected phrase is replaced with each counterfactual from the counterfactual subset to obtain corresponding modified responses and a corresponding set of response scores corresponding to the first phrase. Consequently, the lowest response score in the set of response scores corresponds to the most distant modified response with respect to the original response.

Accordingly, in Block 220, at least one strongest counterfactual corresponding to a lowest response score of the set of response scores for the selected phrase is determined. The strongest counterfactual is the counterfactual with the lowest response score. In accordance with the steps of Block 216 and Block 218, the at least one strongest counterfactual causes the LLM to generate the most distant modified response, which in turn, corresponds to the lowest response score in the set of response scores. Although the terms lowest and highest are used in FIG. 2, if an inverse function is used, then the inverse of the lowest or highest is used.

In Block 222, the selected phrase and the at least one strongest counterfactual of the counterfactual subset is stored as a phrase pair in a data repository. In Block 223, a determination is made whether to select another phrase. If the determination is made in Block 223 to select another phrase, the process repeats starting with Block 204.

Each selected phrase is paired with at least one corresponding strongest counterfactual. Each selected phrase and the at least one corresponding strongest counterfactual are stored as a next phrase-pair in the data repository.

In one or more embodiments, the steps of Block 204 through Block 220 are iterated for the multiple selected phrases of the prompt. Thus, multiple phrase pairs are obtained. The multiple phrase pairs correspond to each selected phrase of the multiple selected phrases. Each selected phrase from the selected plurality of phrases is paired with at least one corresponding strongest counterfactual. By way of example, a prompt may have three selected phrases: "beach," "summer," and "crowded." For the first phrase "beach," two counterfactuals may be obtained— "mountains," and "woodlands." For the second phrase "summer," two counterfactuals may be obtained—"winter,"

and "monsoon." For the third phrase "crowded," one counter factual may be obtained—"empty." The counterfactuals "winter" and "monsoon" may yield modified responses with the same semantic similarity score with respect to the original response. In this case, the phrase "summer" may be paired with both "winter" and "monsoon" to produce two phrase pairs, namely "summer; winter" and "summer; monsoon." On the other hand, the phrase "mountains" may yield a modified response with a lower semantic similarity score than "woodlands," when replacing the phrase "beach." In this case, a single phrase pair may be produced, namely "beach; mountains."

If the determination is made in Block 223 to not select another phrase, the process (200) continues to Block 224. In Block 224, an explainability model is constructed for the LLM with respect to the prompt based on the multiple phrase pairs corresponding to the multiple selected phrases from the prompt. In one or more embodiments, the explainability model may be directed to the particular task of the prompt, or the particular outcome expected from processing the prompt. For example, if a prompt is directed to a task of obtaining insurance approval for a particular drug treatment for a patient, the explainability model may characterize the reasoning of the LLM in terms of which phrases, when replaced by counterfactuals yielded the most distant response. The explainability model may further indicate the strongest counterfactuals for the aforementioned phrases. In one or more embodiments, the explainability model may be based on the responses generated by the LLM and the corresponding response scores. For example, a feature importance score may be stored in a data structure such as a dictionary or an array, indicating the importance of a phrase (and its counterfactual) in influencing the generation of the most distant response. Techniques such as perturbation analysis and saliency maps may be applied to observe changes in the response by systematically altering the selected phrases.

In Block 226, the prompt instructions are modified based on the explainability model to cause the LLM to generate a new response. The new response is semantically similar to an expected response. In one or more embodiments, the new response is semantically more similar to the expected response than the original response. More specifically, a first response similarity score of the new response to the expected response is higher than a second response similarity score of the original response to the expected response. In one or more embodiments, the step(s) of Block 226 may be performed by the developer application in conjunction with the enterprise application. In certain other embodiments, the enterprise application may be updated manually with the re-engineered prompt instructions.

The process of training the syntactic and semantic embedding models is described herein. In one or more embodiments, the syntactic embedding model, and the semantic embedding model (collectively referred to as "embedding models") may be pre-trained embedding models. In other embodiments, the embedding models may require training. Notably, pre-trained models may be additionally fine-tuned through specific training for domain-specific corpora. The training described herein is an embodiment that applies skip-gram techniques for creating context-target pairs. Other techniques may be used, for example, bag-of-words, etc.

Training the embedding models entails the collection of domain-specific or general text documents to form a corpus (e.g., the domain corpus of FIG. 1). The corpus may be pre-processed to remove stop-words, punctuation, and other non-alphanumeric characters, referred to as "noise." The corpus is further tokenized into individual words, phrases, or sub-words. Examples of tokenizers include the NLTK Python Library, spaCy, etc. Further, context-target pairs are generated for a particular context window size. Context-target pairs include a target token occurring in the domain corpus and a context word within the context window size of the target token. In one or more embodiments, the context window size may be a short context window for the syntactic embedding model, for example, two words to the left and right of a target token. In contrast, the context window size may be a long context window for the semantic embedding model, for example, twenty words to the left and right of a target token.

For each target token, the surrounding context words are collected within the specified window. The window is applied successively to each target token in the corpus. In other words, the context window "slides" over the preprocessed text and context words are collected for each target token. The collected context words are each paired with the target token to form context-target pairs. For each context-target pair, skip-grams are generated. A skip-gram consists of a target token and its context words (either left or right). For example, if the context window is two, then the skip-grams for the sentence "The cat sat on the mat" would be: ("cat", ["the", "sat"]), ("sat", ["cat", "on"]), ("on", ["sat", "the"]), and ("the", ["on", "mat"]). Further, token vectors for the target tokens are initialized with random values.

The iterative training process is then initiated. In a forward pass, for each target token, the dot product of the target token vector with the word vectors of the context words is computed. A sigmoid function or other similar function may be applied to the vectors to obtain the probability of each context word, given the target token. In a loss computation, a loss is calculated, using a loss function. The loss is a measure of the difference between the predicted context word vectors and the actual context word vectors corresponding to the target token. The loss may be computed using negative sampling or by a hierarchical softmax objective function. In a backward pass, the gradients of the loss are computed with respect to the context word vectors. The context word vectors are updated using the gradients. An additional learning rate parameter may also be a factor in the word vector update. The process is iterated, from the forward pass to the backward pass, for the corpus for several iterations. Each iteration is known as an epoch. After training, the word vectors may be evaluated using tasks such as word similarities.

The syntactic embedding model and semantic embedding model may be trained as described hereinabove. For the syntactic embedding model, the context window size may be set to two words before and after a phrase. For the semantic embedding model, the context window size may be set to twenty words before and after a phrase.

The trained syntactic and semantic embedding models may be used a priori to generate syntactic and semantic embeddings for the domain corpus. The syntactic and semantic embeddings may be stored in the embedding store of the data repository. Thus, the counterfactuals generator searches the embedding store for syntactic embeddings similar to the syntactic embedding for a given phrase. These syntactic embeddings may correspond to words or phrases with a similar syntactic structure or usage pattern to the given phrase in the domain corpus. Similarly, words or phrases corresponding to semantic embeddings dissimilar or distant to the semantic embedding for a given phrase may encompass the relationships of antonyms (e.g., danger, safety), complementarity, (e.g., alive, dead), converseness (e.g., buy, sell), gradable antonyms (e.g., hot, cold), directional opposites (up, down), and reversives (e.g., tie, untie).

FIG. 3 shows an example of counterfactual evaluation, in accordance with one or more embodiments. The following example is for explanatory purposes only and not intended to limit the scope of one or more embodiments.

Block 302 shows the selection of phrases for counterfactual generation from a prompt to an LLM. The prompt provides an input, describing aspects of a beach in the summer. The prompt instruction takes the form of a query, i.e., "Shall I travel to the beach this summer?" The LLM-generated baseline response is shown. Additionally, the phrase pairs of the selected input phrases and corresponding counterfactuals are shown with corresponding cosine distances for syntactic similarity and semantic similarity. The first phrase, "summer," is paired with the counterfactual "winter." The syntactic similarity of "summer" between "winter" is relatively high compared to the semantic similarity between "summer" and "winter." The syntactic similarity corresponds to a value obtained by evaluating Equation (1) between "summer" and "winter". Likewise, the semantic similarity corresponds to a value obtained by evaluating Equation (2) between "summer" and "winter". Finally, the score corresponds to a value obtained by evaluating Equation (3) on the syntactic and semantic similarities. Each selected phrase of the input of Block 302 (shown in bold font) is processed in a similar manner.

In Block 304, the first counterfactual is substituted for the first phrase and is processed by the LLM. The LLM-generated response is shown in Block 304, with the underlined text highlighting the change between the response of Block 304 and the baseline response of Block 302. Different factors pertaining to specific precautions relevant to "winter" are introduced in the response. The response is accurate and pertinent and reflects a change directly co-relatable to the first counterfactual substitution.

In Block 306, the first substitution is reversed, and the second phrase is substituted with the counterfactual. The LLM-generated response is shown with the underlined text highlighting the inaccuracy of the response. The LLM mistakenly generates activity suggestions associated with both beaches and mountains. The response is confusing and inaccurate, indicating that the second phrase substitution caused the LLM to respond less favorably than the baseline response.

In Block 308, the second substitution is reversed, and the third phrase is substituted with its corresponding counterfactual. The LLM-generated response is shown to be identical in semantic meaning to that of the baseline response of Block 304, with minor differences in wording. The response indicates that the third phrase may not have as much weightage or importance in the response-generation, as, for example, the first phrase. Likewise in Block 310, when the third substitution is reversed, and the fourth phrase is substituted with its corresponding counterfactual, the LLM-generated response is identical to the response of Block 308. The response indicates that the fourth phrase is not given as much weightage or importance in the response-generation as the first phrase.

The evaluation may be continued by substituting different combinations of counterfactuals for corresponding phrase combinations. The responses may be accordingly evaluated. In the example shown, the LLM may be seen to conflate the context of a location with the context of the location-related description as depicted in Block 306. Here, although the location is changed from "beach" to "mountain," the word "waves" remains in the prompt, related to a location dependent activity. The LLM then generates activities corresponding to both the location and the location dependent description ("relax on the beach," "swim in the waves," and "hiking or mountain biking"). This observation may cause the prompt instruction to be altered to include a directive of giving more importance to a particular phrase of the prompt. Additionally, or alternatively, the observation may lead to changing attention parameters of the LLM to give importance to a location over location-dependent activity.

One or more embodiments may be implemented on a computing system specifically designed to achieve an improved technological result. When implemented in a computing system, the features and elements of the disclosure provide a significant technological advancement over computing systems that do not implement the features and elements of the disclosure. Any combination of mobile, desktop, server, router, switch, embedded device, or other types of hardware may be improved by including the features and elements described in the disclosure.

Figure 4A:
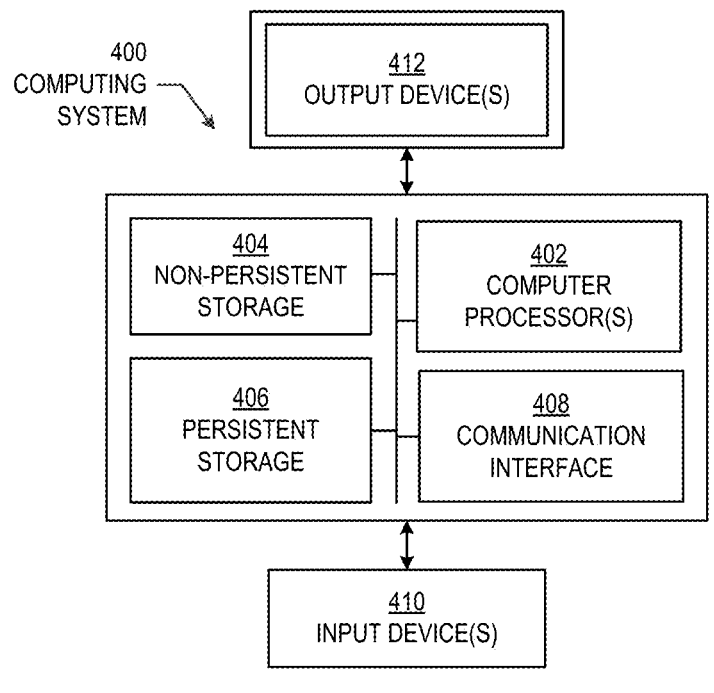
FIG. 4A and FIG. 4B show an example of a computing system and a network environment, in accordance with one or more embodiments.

For example, as shown in FIG. 4A, the computing system (400) may include one or more computer processor(s) (402), non-persistent storage device(s) (404), persistent storage device(s) (406), a communication interface (408) (e.g., Bluetooth interface, infrared interface, network interface, optical interface, etc.), and numerous other elements and functionalities that implement the features and elements of the disclosure. The non-persistent storage device(s) (404) and persistent storage device(s) (406) may be physical storage devices. The computer processor(s) (402) may be an integrated circuit for processing instructions. The computer processor(s) (402) may be one or more cores, or micro-cores, of a processor. The computer processor(s) (402) includes one or more processors. The computer processor(s) (402) may include a central processing unit (CPU), a graphics processing unit (GPU), a tensor processing unit (TPU), combinations thereof, etc.

The input device(s) (410) may include a touchscreen, keyboard, mouse, microphone, touchpad, electronic pen, or any other type of input device. The input device(s) (410) may receive inputs from a user that are responsive to data and messages presented by the output device(s) (412). The inputs may include text input, audio input, video input, etc., which may be processed and transmitted by the computing system (400) in accordance with one or more embodiments. The communication interface (408) may include an integrated circuit for connecting the computing system (400) to a network (not shown) (e.g., a local area network (LAN), a wide area network (WAN) such as the Internet, mobile network, or any other type of network) or to another device, such as another computing device, and combinations thereof.

Further, the output device(s) (412) may include a display device, a printer, external storage, or any other output device. One or more of the output devices(s) (412) may be the same or different from the input device(s) (410). The input device(s) (410) and output device(s) (412) may be locally or remotely connected to the computer processor(s) (402). Many different types of computing systems exist, and the aforementioned input device(s) (410) and output device(s) (412) may take other forms. The output device(s) (412) may display data and messages that are transmitted and received by the computing system (400). The data and messages may include text, audio, video, etc., and include the data and messages described above in the other figures of the disclosure.

Software instructions in the form of computer readable program code to perform embodiments may be stored, in whole or in part, temporarily or permanently, on a non-transitory computer readable medium such as a solid state drive (SSD), compact disk (CD), digital video disk (DVD), storage device, a diskette, a tape, flash memory, physical memory, or any other computer readable storage medium. Specifically, the software instructions may correspond to computer readable program code that, when executed by the computer processor(s) (402), is configured to perform one or more embodiments, which may include transmitting, receiving, presenting, and displaying data and messages described in the other figures of the disclosure.

Figure 4B:
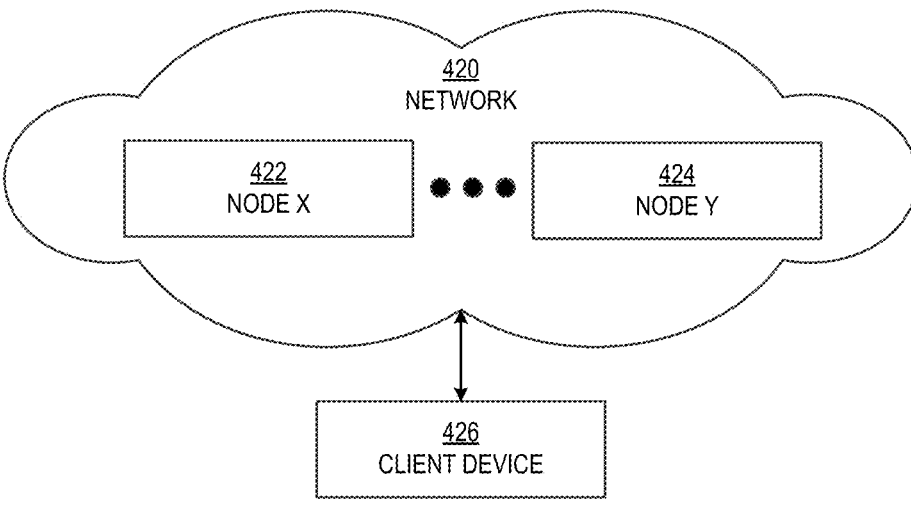

The computing system (400) in FIG. 4A may be connected to, or be a part of, a network. For example, as shown in FIG. 4B, the network (420) may include multiple nodes (e.g., node X (422), node Y (424), as well as extant intervening nodes between node X (422), node Y (424)). Each node may correspond to a computing system, such as the computing system (400) shown in FIG. 4A, or a group of nodes combined may correspond to the computing system (400) shown in FIG. 4A. By way of an example, embodiments may be implemented on a node of a distributed system that is connected to other nodes. By way of another example, embodiments may be implemented on a distributed computing system having multiple nodes, where each portion may be located on a different node within the distributed computing system. Further, one or more elements of the aforementioned computing system (400) may be located at a remote location and connected to the other elements over a network.

The nodes (e.g., node X (422), node Y (424)) in the network (420) may be configured to provide services for a client device (426). The services may include receiving requests and transmitting responses to the client device (426). For example, the nodes may be part of a cloud computing system. The client device (426) may be a computing system, such as the computing system (400) shown in FIG. 4A. Further, the client device (426) may include or perform all or a portion of one or more embodiments.

The computing system (400) of FIG. 4A may include functionality to present data (including raw data, processed data, and combinations thereof) such as results of comparisons and other processing. For example, presenting data may be accomplished through various presenting methods. Specifically, data may be presented by being displayed in a user interface, transmitted to a different computing system, and stored. The user interface may include a graphical user interface (GUI) that displays information on a display device. The GUI may include various GUI widgets that organize what data is shown, as well as how data is presented to a user. Furthermore, the GUI may present data directly to the user, e.g., data presented as actual data values through text, or rendered by the computing device into a visual representation of the data, such as through visualizing a data model.

As used herein, the term "connected to" contemplates multiple meanings. A connection may be direct or indirect (e.g., through another component or network). A connection may be wired or wireless. A connection may be a temporary, permanent, or a semi-permanent communication channel between two entities.

The various descriptions of the figures may be combined and may include, or be included within, the features described in the other figures of the application. The various elements, systems, components, and steps shown in the figures may be omitted, repeated, combined, or altered as shown in the figures. Accordingly, the scope of the present disclosure should not be considered limited to the specific arrangements shown in the figures.

In the application, ordinal numbers (e.g., first, second, third, etc.) may be used as an adjective for an element (i.e., any noun in the application). The use of ordinal numbers is not to imply or create any particular ordering of the elements, nor to limit any element to being only a single element unless expressly disclosed, such as by the use of the terms "before," "after," "single," and other such terminology. Rather, ordinal numbers distinguish between the elements. By way of an example, a first element is distinct from a second element, and the first element may encompass more than one element and succeed (or precede) the second element in an ordering of elements.

Further, unless expressly stated otherwise, the conjunction "or" is an inclusive "or" and, as such, automatically includes the conjunction "and," unless expressly stated otherwise. Further, items joined by the conjunction "or" may include any combination of the items with any number of each item, unless expressly stated otherwise.

In the above description, numerous specific details are set forth in order to provide a more thorough understanding of the disclosure. However, it will be apparent to one of ordinary skill in the art that the technology may be practiced without these specific details. In other instances, well-known features have not been described in detail to avoid unnecessarily complicating the description. Further, other embodiments not explicitly described above can be devised which do not depart from the scope of the claims as disclosed herein. Accordingly, the scope should be limited only by the attached claims.

What is claimed is:

1. A method comprising:
   obtaining a prompt to a field large language model (LLM) and a corresponding original response generated by the field LLM;
   selecting a first phrase from a selected plurality of phrases from the prompt;
   obtaining a syntactic phrase set for the first phrase from a domain corpus;
   obtaining a semantic phrase set for the first phrase from the domain corpus;
   selecting a counterfactual set including phrases co-occurring in the syntactic phrase set and the semantic phrase set;
   assigning a counterfactual score for each counterfactual of the counterfactual set;
   selecting a first counterfactual from a counterfactual subset of the counterfactual set having highest counterfactual scores;
   replacing the first phrase in the prompt with the first counterfactual to obtain a modified prompt and processing the modified prompt by the field LLM to obtain a modified response; and
   storing the first phrase and at least one strongest counterfactual of the counterfactual subset as a first phrase pair in a data repository.

2. The method of claim 1, further comprising:
   obtaining the syntactic phrase set for the first phrase from the domain corpus by:
      obtaining a first syntactic embedding corresponding to the first phrase from a syntactic embedding model,
      searching an embedding store for syntactic embeddings corresponding to phrases in the domain corpus that are similar to the first syntactic embedding, and
      selecting the phrases in the domain corpus as the syntactic phrase set.

3. The method of claim 1, further comprising:

obtaining the semantic phrase set for the first phrase from the domain corpus by:

obtaining a first semantic embedding corresponding to the first phrase from a semantic embedding model, searching an embedding store for semantic embeddings corresponding to phrases in the domain corpus that are distant to the first semantic embedding, and selecting the phrases in the domain corpus as the semantic phrase set.

4. The method of claim 1, further comprising:

assigning the counterfactual score for each counterfactual of the counterfactual set as a syntactic embedding cosine distance of the each counterfactual with respect to the first phrase, divided with a semantic embedding cosine distance of the each counterfactual with respect to the first phrase.

5. The method of claim 1, further comprising:

prior to storing the first phrase and the at least one strongest counterfactual:

determining a response score corresponding to the modified response as a semantic similarity score of the modified response to the original response based on a scoring function, replacing the first phrase with each counterfactual from the counterfactual subset to obtain corresponding modified responses and a corresponding set of response scores corresponding to the first phrase, and determining the at least one strongest counterfactual of the counterfactual subset that corresponds to a lowest response score of the set of response scores corresponding to the first phrase.

6. The method of claim 1, further comprising:

pairing each selected phrase from the selected plurality of phrases with at least one corresponding strongest counterfactual; and storing the each selected phrase and the at least one corresponding strongest counterfactual as a next phrase-pair in the data repository.

7. The method of claim 1, further comprising:

constructing an explainability model for the LLM with respect to the prompt based on a plurality of phrase-pairs corresponding the plurality of selected phrases from the prompt.

8. The method of claim 1, further comprising:

modifying instructions of the prompt based on an explainability model to cause the LLM to generate a new response, wherein the new response is semantically similar to an expected response, and wherein a first response similarity score of the new response to the expected response is higher than a second response similarity score of the original response to the expected response.

9. The method of claim 1 further comprising:

generating a plurality of syntactic embeddings from the domain corpus by a syntactic embedding model, wherein the syntactic embedding model is trained to generate first word embeddings using a short context window of two words;

storing the plurality of syntactic embeddings in an embedding store;

generating a plurality of semantic embeddings from the domain corpus by a semantic embedding model, wherein the semantic embedding model is trained to generate second word embeddings using a long context window of twenty words; and storing the plurality of semantic embeddings in the embedding store.

10. A system comprising:

at least one computer processor;

a field LLM executing on the at least one computer processor;

an enterprise application executing on the at least one computer processor;

a developer application executing on the at least one computer processor;

a domain corpus in a data repository stored on a physical storage device;

an embedding store in the data repository; and and a counterfactuals generator executing on the at least one computer processor;

wherein the developer application is configured to:

obtain a prompt to a field large language model (LLM) and a corresponding original response generated by the field LLM from the enterprise application, select a first phrase from a selected plurality of phrases from the prompt;

obtain, from the counterfactuals generator, a syntactic phrase set for the first phrase from the domain corpus, obtain, from the counterfactuals generator, a semantic phrase set for the first phrase from the domain corpus, cause the counterfactuals generator to select a counterfactual set including phrases co-occurring in the syntactic phrase set and the semantic phrase set, assign a counterfactual score for each counterfactual of the counterfactual set, select a first counterfactual from a counterfactual subset of the counterfactual set having highest counterfactual scores, replace the first phrase in the prompt with the first counterfactual to obtain a modified prompt and process the modified prompt by the field LLM to obtain a modified response, and store the first phrase and at least one strongest counterfactual of the counterfactual subset as a first phrase pair in the data repository.

11. The system of claim 10, wherein the counterfactuals generator is further configured to:

obtain the syntactic phrase set for the first phrase from the domain corpus by:

obtaining a first syntactic embedding corresponding to the first phrase from a syntactic embedding model, searching the embedding store for syntactic embeddings corresponding to phrases in the domain corpus that are similar to the first syntactic embedding, and selecting the phrases in the domain corpus as the syntactic phrase set.

12. The system of claim 10, wherein the counterfactuals generator is further configured to:

obtain the semantic phrase set for the first phrase from the domain corpus by:

obtaining a first semantic embedding corresponding to the first phrase from a semantic embedding model, searching the embedding store for semantic embeddings corresponding to phrases in the domain corpus that are distant to the first semantic embedding, and selecting the phrases in the domain corpus as the semantic phrase set.

13. The system of claim 10, wherein the developer application is further configured to:

assign the counterfactual score for each counterfactual of the counterfactual set as a syntactic embedding cosine distance of the each counterfactual with respect to the first phrase, divided with a semantic embedding cosine distance of the each counterfactual with respect to the first phrase.

14. The system of claim 10, wherein the developer application is further configured to:

prior to storing the first phrase and the at least one strongest counterfactual:

determine a response score corresponding to the modified response as a semantic similarity score of the modified response to the original response based on a scoring function, replace the first phrase with each counterfactual from the counterfactual subset to obtain corresponding modified responses and a corresponding set of response scores corresponding to the first phrase; and determine the at least one strongest counterfactual of the counterfactual subset that corresponds to a lowest response score of the set of response scores corresponding to the first phrase.

15. The system of claim 10, wherein the developer application is further configured to:

pair each selected phrase from the selected plurality of phrases with at least one corresponding strongest counterfactual; and store the each selected phrase and the at least one corresponding strongest counterfactual as a next phrase-pair in the data repository.

16. The system of claim 10, wherein the developer application is further configured to:

construct an explainability model for the LLM with respect to the prompt based on a plurality of phrase-pairs corresponding the plurality of selected phrases from the prompt.

17. The system of claim 10, wherein the developer application is further configured to:

modify instructions of the prompt based on an explainability model to cause the LLM to generate a new response, wherein the new response is semantically similar to an expected response, and wherein a first response similarity score of the new response to the expected response is higher than a second response similarity score of the original response to the expected response.

18. The system of claim 10 wherein:

the counterfactuals generator includes a syntactic embedding model and a semantic embedding model;

the syntactic embedding model is trained to generate first word embeddings using a short context window of two words and configured to generate a plurality of syntactic embeddings from the domain corpus;

the semantic embedding model is trained to generate second word embeddings using a long context window of twenty words, and configured to generate a plurality of semantic embeddings from the domain corpus; and wherein the developer application is configured to:

store the plurality of syntactic embeddings and the plurality of semantic embeddings in the embedding store.

19. A method comprising:

obtaining a prompt to a field large language model (LLM) and a corresponding original response generated by the field LLM;

selecting a plurality of phrases from the prompt;

selecting a first phrase from the selected plurality of phrases;

obtaining a syntactic phrase set for the first phrase from a domain corpus by:

obtaining a first syntactic embedding corresponding to the first phrase from a syntactic embedding model, searching an embedding store for syntactic embeddings corresponding to a first plurality of phrases in the domain corpus that are similar to the first syntactic embedding, and selecting the first plurality of phrases in the domain corpus as the syntactic phrase set;

obtaining a semantic phrase set for the first phrase from the domain corpus by:

obtaining a first semantic embedding corresponding to the first phrase from a semantic embedding model, searching the embedding store for semantic embeddings corresponding to a second plurality of phrases in the domain corpus that are distant from the first semantic embedding, and selecting the second plurality of phrases in the domain corpus as the semantic phrase set;

selecting a counterfactual set including phrases co-occurring in the syntactic phrase set and the semantic phrase set;

assigning a counterfactual score for each counterfactual of the counterfactual set as a syntactic embedding cosine distance of the each counterfactual with respect to the first phrase, divided with a semantic embedding cosine distance of the each counterfactual with respect to the first phrase;

selecting a first counterfactual from a counterfactual subset of the counterfactual set having highest counterfactual scores;

replacing the first phrase in the prompt with the first counterfactual to obtain a modified prompt and processing the modified prompt by the field LLM to obtain a modified response; and storing the first phrase and at least one strongest counterfactual of the counterfactual subset as a first phrase pair in a data repository.

20. The method of claim 19, further comprising:

prior to storing the first phrase and the at least one strongest counterfactual:

determining a response score corresponding to the modified response as a semantic similarity score of the modified response to the original response based on a scoring function, replacing the first phrase with each counterfactual from the counterfactual subset to obtain corresponding modified responses and a corresponding set of response scores corresponding to the first phrase, and determining the at least one strongest counterfactual of the counterfactual subset that corresponds to a lowest response score of the set of response scores corresponding to the first phrase.

* * * * *